(No Model.)
C. W. HEDENBERG & C. S. REAMY.
BRAZED TUBE JOINT.
No. 582,138. Patented May 4, 1897.
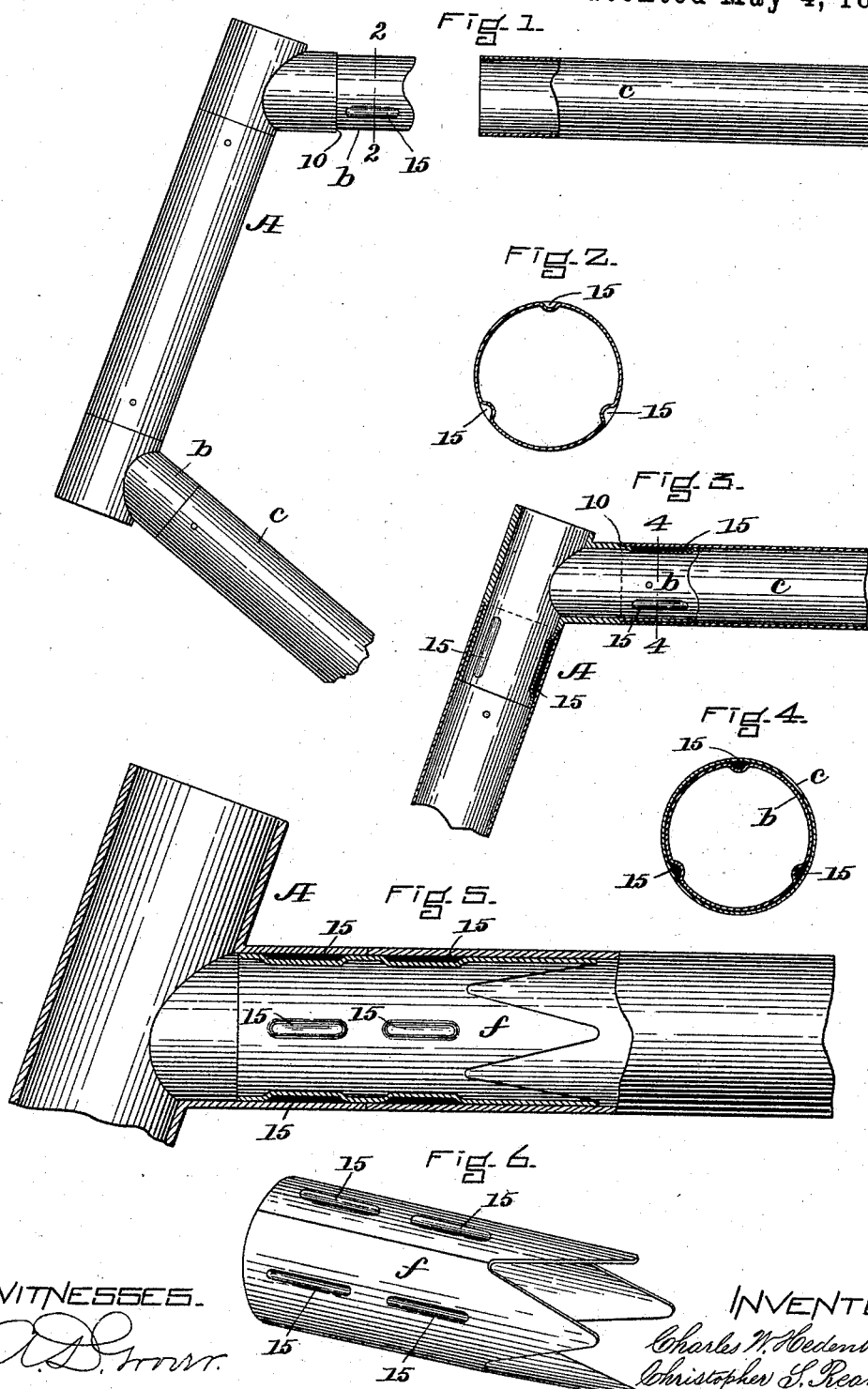

UNITED STATES PATENT OFFICE.

CHARLES W. HEDENBERG AND CHRISTOPHER S. REAMY, OF NEEDHAM, MASSACHUSETTS.

BRAZED TUBE-JOINT.

SPECIFICATION forming part of Letters Patent No. 582,138, dated May 4, 1897.

Application filed January 13, 1897. Serial No. 619,116. (No model.)

*To all whom it may concern:*

Be it known that we, CHARLES W. HEDENBERG and CHRISTOPHER S. REAMY, citizens of the United States, residing at Needham, in the county of Norfolk and State of Massachusetts, have invented an Improvement in Brazed Tube-Joints, of which the following is a full, clear, and exact description, reference being had to the accompanying drawings, making part of this specification, in which—

Figure 1 is a side elevation of a portion of a bicycle-frame having brazed tube-joints made in accordance with our invention, the two sections or parts which form one of the joints being separated to show the interior construction. Fig. 2 is an enlarged section on the line 2 2 of Fig. 1. Fig. 3 is a sectional elevation of our joint complete. Fig. 4 is an enlarged section on the line 4 4 of Fig. 3. Fig. 5 is a sectional elevation of a portion of a bicycle-frame, illustrating a reinforced joint embodying our invention. Fig. 6 is a perspective view of the tubular reinforcing-piece shown in Fig. 5.

In making brazed tube-joints such as those used for bicycle-frames, &c., where one part is slipped within the other, it has been customary to first heat the parts and then allow the brass or soldering metal, as it melts, to flow in at the end of the joint and introduce itself as best it can between the two surfaces to be united. This method is, however, open to the objection that the fused metal does not distribute itself as uniformly as is desirable over the surfaces to be united, resulting in an imperfect joint which lacks strength, and is consequently liable to fracture.

Our invention has for its object to overcome this difficulty and to insure the even distribution of the soldering metal within the joint; and to this end our invention consists in a tube-joint composed of two parts or sections fitting one within the other, the inner part or section being provided on its outer surface with pockets or cavities for holding the soldering metal, which when the two parts of the joint are put together and subsequently heated melts and distributes itself uniformly in such manner as to entirely fill the space between the two surfaces to be united, thereby insuring a perfect joint, as hereinafter more fully set forth.

In the said drawings, A represents a portion of a bicycle-frame composed of steel tubing united by means of brazed joints. Each of these joints, one of which is shown separated in Fig. 1, is composed of two parts or sections $b$ $c$, fitting one within the other, as shown in Fig. 3, the inner portion $b$ being preferably turned down to form a shoulder 10, against which abuts the outer portion $c$, thus forming a smooth flush joint, as shown at the lower portion of Fig. 1 and in Fig. 3.

The inner section or portion $b$ of the joint is provided with a series of cavities or pockets 15, which are struck up with a suitable die and are adapted to contain the brass or other soldering metal to be used in brazing the joint, mixed as usual with a suitable flux. The cavities or pockets 15 are preferably made of oblong form, as shown, but they may be of oval, circular, or other desired shape, and these pockets also serve to stiffen the joint to a considerable degree.

In making the joint the cavities 15 are first filled with the brass or soldering metal and flux, after which the counterpart section $c$ is slipped over the part $b$ and the joint subjected to a sufficient degree of heat to melt the brass in the pockets or cavities 15, which then flows into and entirely fills the space between the two portions $b$ $c$, uniformly distributing itself in a thin even layer over the surfaces to be united, and thereby forming a strong and perfect joint which is much less liable to fracture than ordinary brazed joints as hitherto made, on account of the complete union of the brass with all parts of the joint. The outer end of the portion $b$ is preferably scalloped or notched instead of being made with a straight edge to lessen the liability of fracture, and this notched portion may be made thinner toward the end by reaming out the metal from its interior surface.

With our improved construction no appreciable quantity of brass flows out of the joint and no filing is necessary. Furthermore, less heat is required, for the reason that the brass, before being melted, is placed inside the joint where it is wanted, and the parts do not therefore require to be unduly heated, as is often necessary with ordinary joints to enable the brass to flow in from the outside of the joint.

When desired to thicken or reinforce a joint, a short piece of tube $f$, composed of sheet-steel bent into cylindrical form and provided with longitudinal cavities or pockets 15, like those on the portion $b$, above described, and similarly filled with brass and flux, is employed, said reinforcing-piece $f$ fitting within the two abutting parts to be connected, as shown in Fig. 5, after which the joint is heated to melt the brass, which completely fills the space between the several parts, as previously described.

What we claim as our invention, and desire to secure by Letters Patent, is—

A tube-joint composed of two parts or sections fitting one within the other, the inner part or section being provided on its outer surface with cavities or pockets for containing the soldering metal and flux, whereby the solder is caused, when melted, to uniformly distribute itself and entirely fill the space between the inner and outer sections when fitted together and heated, substantially as described.

Witness our hands this 1st day of January, A. D. 1897.

CHARLES W. HEDENBERG.
CHRISTOPHER S. REAMY.

In presence of—
EUGENE P. CLOUDMAN,
JOSEPH N. BETHEL.